United States Patent [19]

Shirk

[11] Patent Number: 5,360,960
[45] Date of Patent: Nov. 1, 1994

[54] LIGHT INTENSITY WELD MONITOR
[75] Inventor: Bryan W. Shirk, Mesa, Ariz.
[73] Assignee: TRW Inc., Lyndhurst, Ohio
[21] Appl. No.: 103,448
[22] Filed: Aug. 6, 1993

Related U.S. Application Data

[63] Continuation-in-part of Ser. No. 904,976, Jun. 26, 1992.
[51] Int. Cl.5 .................................................. B23K 26/02
[52] U.S. Cl. ......................... 219/121.83; 219/121.63; 219/121.64
[58] Field of Search ....................... 219/121.63, 121.64, 219/121.83

[56] References Cited

U.S. PATENT DOCUMENTS

| | | | |
|---|---|---|---|
| 3,262,006 | 7/1966 | Sciaky et al. | 314/63 |
| 4,446,354 | 5/1984 | Kearney | 219/130.01 |
| 4,663,513 | 5/1987 | Webber | 219/121.63 X |
| 4,766,285 | 8/1988 | Decgilloz et al. | 219/121.63 |
| 5,155,329 | 10/1992 | Terada et al. | 219/121.83 |

Primary Examiner—C. L. Albritton
Attorney, Agent, or Firm—Tarolli, Sundheim & Covell

[57] ABSTRACT

A monitoring system monitors a laser process which delivers energy from a laser source (10) to a workpiece (18) along a process path while producing plasma at a beam delivery point (22) along the path. A light detector (26) is positioned for receiving light emitted from the plasma. The detector (26) provides a light signal having a value which varies with changes in the intensity of the received light over a predetermined test interval. A plurality of light limits (1-6) are established with each limit having a different value. The light signal is compared with each light limit and a violation indication is provided each time the light signal violates one of the limits. The number of violation indications for each limit are counted over the predetermined test interval. The laser process is evaluated as a function of the number of violation indications during the test interval. An output indication is provided as to the result of the evaluation.

17 Claims, 4 Drawing Sheets

LIGHT INTENSITY WELD MONITOR

This is a continuation-in-part application of my copending U.S. patent application Ser. No. 904,976 filed on Jun. 26, 1992 and which is assigned to the same assignee as that of the present application.

Technical Field

The present invention is directed to monitoring a laser welding process and providing an evaluation of the process.

BACKGROUND OF THE INVENTION

There are examples in the prior art of systems for monitoring a laser welding process and providing an evaluation of the process. One such example takes the form of the U.S. Pat. No. to T. Webber 4,663,513 which discloses a system for monitoring a laser welding process. In that process, a laser is employed for delivering energy to a workpiece along a process path while producing plasma at a beam delivery point along the path. Infrared radiation from a point behind and in close proximity to the location of the beam delivery point is detected by a radiation detector. The radiation detector provides an analog temperature signal having a value which varies over time with changes in intensity of the received infrared radiation. The analog temperature signal is compared against a window range of acceptable temperatures including a fixed upper limit and a fixed lower limit. If the temperature signal is not within the window range, then the output of the laser process is rejected.

The system described above in the aforesaid patent is not a real time monitoring system. Instead, it monitors infrared radiation from a point behind the location of the beam delivery point. The infrared detector does not respond to ultraviolet or visible light emissions from the plasma itself so as to provide real time monitoring. Moreover, the system provides either a process rejection or acceptance depending upon whether the temperature signal has a value which is within the window range or is outside of the window range. Consequently, this is a pass-fail test.

The U.S. Pat. No. to Sciaky et al. U.S. Pat. No. 3,262,006 discloses a welding control system having a light sensitive probe incorporating an arrangement using fiberoptics to conduct illumination from an area adjacent a weld to a photo transducer disposed at a remote location. Also, an ultraviolet filter may be employed in the system to see through the flame portion of the weld arc to the inner plasma portion. The system is employed to maintain an electrode at a substantially constant distance from the workpiece. While presenting real time monitoring, there is no teaching of determining relative quality of the welding process.

The U.S. Pat. No. to Kearney 4,446,354 discloses a weld monitoring system employing fiberoptic delivery of incident radiation to a plurality of photo detectors. The photo detectors evaluate the weld by determining the relative spectral energy of various wavelengths. These energy levels are compared with single level guard bands or limits to provide a pass-fail test.

Statement of the Invention

The present invention is directed toward improvements in monitoring a laser process in real time by detecting the visible and/or ultraviolet emissions from the weld plasma while calculating a quality factor based on comparing acquired data to statistically determined limits.

In accordance with the present invention, a laser process is monitored. The monitored process delivers energy from a laser source to a workpiece along a process path while producing light emitting plasma at a beam delivery point along the path. A light detector is located for receiving light emitted from the plasma. The detector provides a light signal having a value which varies with changes in the intensity of the received light over a predetermined test interval. A plurality of light limits are established with each limit having a different value. The light signal is compared with each light limit and a violation indication is provided each time the light signal violates one of the limits. The violation indications for each limit are counted over a predetermined test interval. The laser process is evaluated as a function of the number of violation indications during the test interval, and an output indication is provided in accordance with the evaluation.

BRIEF DESCRIPTION OF THE DRAWINGS

The foregoing and other objects of the invention will become more readily apparent from the following description of the preferred embodiment of the invention as taken in conjunction with the accompanying drawings which are a part hereof and in which:

FIG. 3, including

DESCRIPTION OF PREFERRED EMBODIMENT

Reference is now made to the drawings in which the showings are for purposes of illustrating a preferred embodiment of the invention only and not for limiting the invention.

Figure 1:
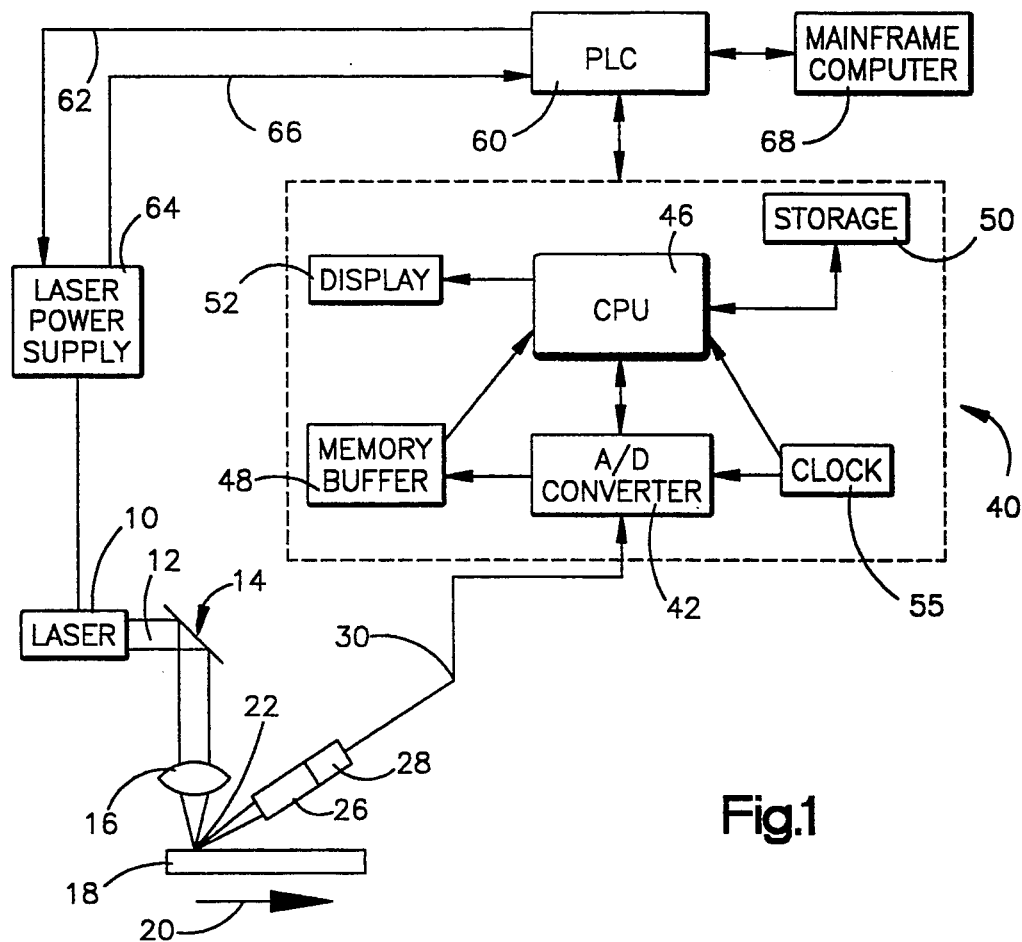
FIG. 1 is a schematic-block diagram illustration of one embodiment of the present invention.

FIG. 1 is a schematic-block diagram illustration of the monitoring system of the present invention which is employed for monitoring a laser welding process. In this process, a laser 10 is employed for transmitting a laser beam 12 to a beam delivery system 14 wherein the beam is redirected and then focused by suitable focusing optics 16. The focused beam impinges on a workpiece 18, which travels in a direction as indicated by the arrow 20. The laser beam impinges on the workpiece 18 at a weld location 22 with sufficient linear power density to form a plasma keyhole to effect a weld. The ultraviolet and near ultraviolet emissions of the plasma are measured by means of a focused photo-detector 26. The output from the photodetector 26 is amplified and electronically filtered by an internal signal processor 28. The signal processor 28 provides an amplified electrical signal representative of the radiated emissions of the plasma at the weld location. The signal is transmitted by means of a shielded cable 30 to a microcomputer 40.

The microcomputer 40 may be of conventional design and includes an analog-to-digital converter 42 which is supplied with clock pulses from a clock 55. The analog-to-digital converter 42 receives the amplified signal from the internal signal processor 28 and in a known manner provides light intensity samples which occur at the frequency of the clock pulses. These light intensity samples are digital words which are supplied to a central processing unit (CPU) 46 by way of a memory buffer 48. The CPU 46 stores the received data including the light intensity samples in storage 50, which may take the form of a hard disk. A light intensity waveform and other data may be displayed under control of the CPU 46 by means of a conventional display 52.

The CPU 46 communicates with a programmable logic controller (PLC) 60. The PLC 60 may take the form of another microcomputer. The PLC 60 controls the welding operations and activates the monitoring system. The PLC 60 starts the welding operations by applying a start weld signal on control line 62 to a laser power supply 64 which, in turn, energizes the laser 10. The operation of the laser power supply 64 may be monitored by the PLC 60 for such information as a power fault or weld completed by way of line 66. Whenever the PLC 60 starts a weld operation, it also activates the microcomputer 40 with a trigger signal so that the operation as presented by the flow chart in FIG. 3 may commence. The PLC 60 also communicates with a main frame computer 68. The computer 68 may be used, for example, for long term data storage. This facilitates traceability in the event that information is sought at a later time with respect to a particular weld process. Thus, for example, a workpiece serial number may be used to identify particular weld information and petit the computer 68 to find and retrieve that information.

Figure 2:
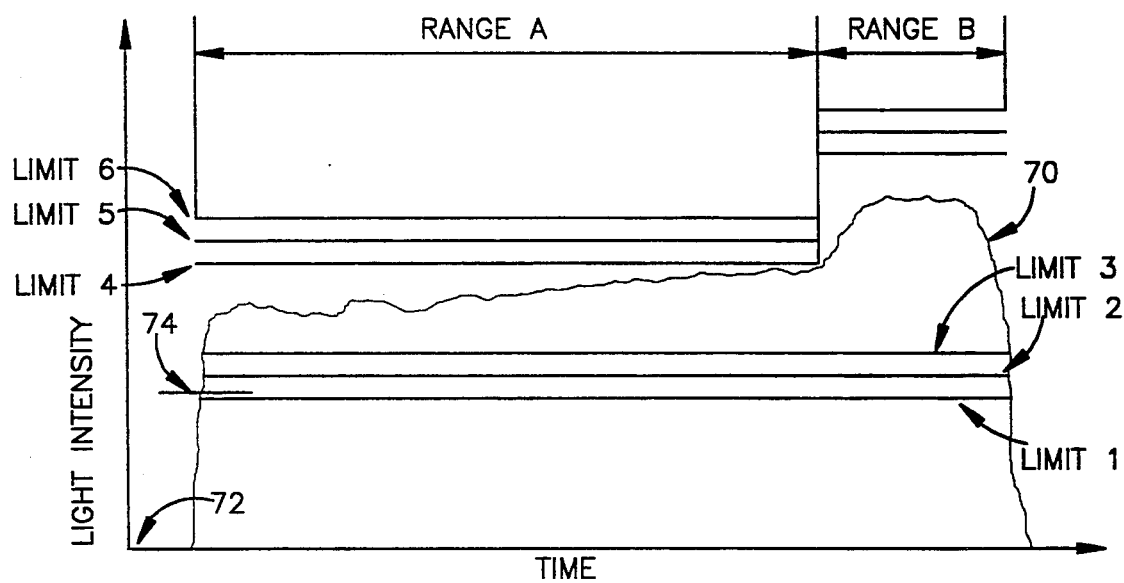
FIG. 2 is a graphical illustration of light intensity with respect to time which is useful in describing the operation of the invention.

FIG. 2 is a graphical illustration of light intensity with respect to time. A weld light intensity curve 70 may take the form of a curve which is plotted from light intensity samples which are taken by the photo detector 26, in accordance with the invention. Starting from 0, the curve represents a large number of samples provided by the analog-to-digital converter 42. The total number of samples may be on the order of 1,410. Initially, there is a trigger delay 72 during which the samples are not used. The trigger delay 72 may, in terms of sample time, have a duration of 100 samples. Range A is the standard weld portion of the weld where the laser power and speed is regulated to perform an initial pass over the weld surface to effect a weld that meets the design penetration requirements. Range A starts when the CPU 46 detects a digital word which represents a threshold light intensity level 74 that denotes a weld of sufficient intensity to meet the design penetration requirement. This range covers a majority of the weld and out of a total of 1,410 samples, this range may have a duration on the order of 1,000 samples. The final or last range of the weld is range B. This is the overlap portion of a circular weld where the light intensity increases because the weld surface effectively moves closer. The plasma level tends to grow due to the shorter distance from the focusing optics 16 to the work surface 18. Range B may have a duration of 300 samples.

In accordance with the present invention, the weld monitoring system is employed for evaluating light intensity samples taken from the weld plasma during the welding operation. This permits the detection of such process anomalies as pinholes, interrupted welds, part mismatch, gaps in the part interface, insufficient laser power and improper rotational speed. The monitoring system employs limits for the light intensity samples. Violations of the limits by the samples are counted, and the number of violations is used for calculating a plasma profile factor (PPF). The plasma profile factor PPF is compared with a predetermined acceptance limit (AL) to determine weld acceptability.

Referring again to FIG. 2, the light intensity samples making up the curve 70 are compared against lower and upper limits. These limits are indicated as lower limits 1, 2, 3, and upper limits 4, 5, and 6. The microcomputer is programmed, as will be discussed hereinafter, to keep track of the number of violations of limits 1–6 by the various light intensity samples. The plasma profile factor PPF is then calculated by a formula that requires that the number of limit violations for each limit 1–6 be multiplied by a weighting factor (WF) unique to that particular limit. The result is divided by the total number of samples. This calculation is made for each of the limits 1–6. The sum total of the individual limit calculations is then subtracted from 100 so that the plasma profile factor PPF will be a number less than 100, such as 92.5, for example. The plasma profile factor PPF is then compared with an acceptance limit AL to determine whether the weld is acceptable. The acceptance limit AL may, for example, be set at 70. Any calculated plasma profile factor PPF in excess of 70 would then be considered as an acceptable weld. Whether the weld is acceptable or not is information that is supplied by the microcomputer 40 to the PLC 60 along with the value of the plasma profile factor PPF. The microcomputer 40 may then display the light intensity waveform, such as waveform 70, on its video display 52.

Figure 3A:
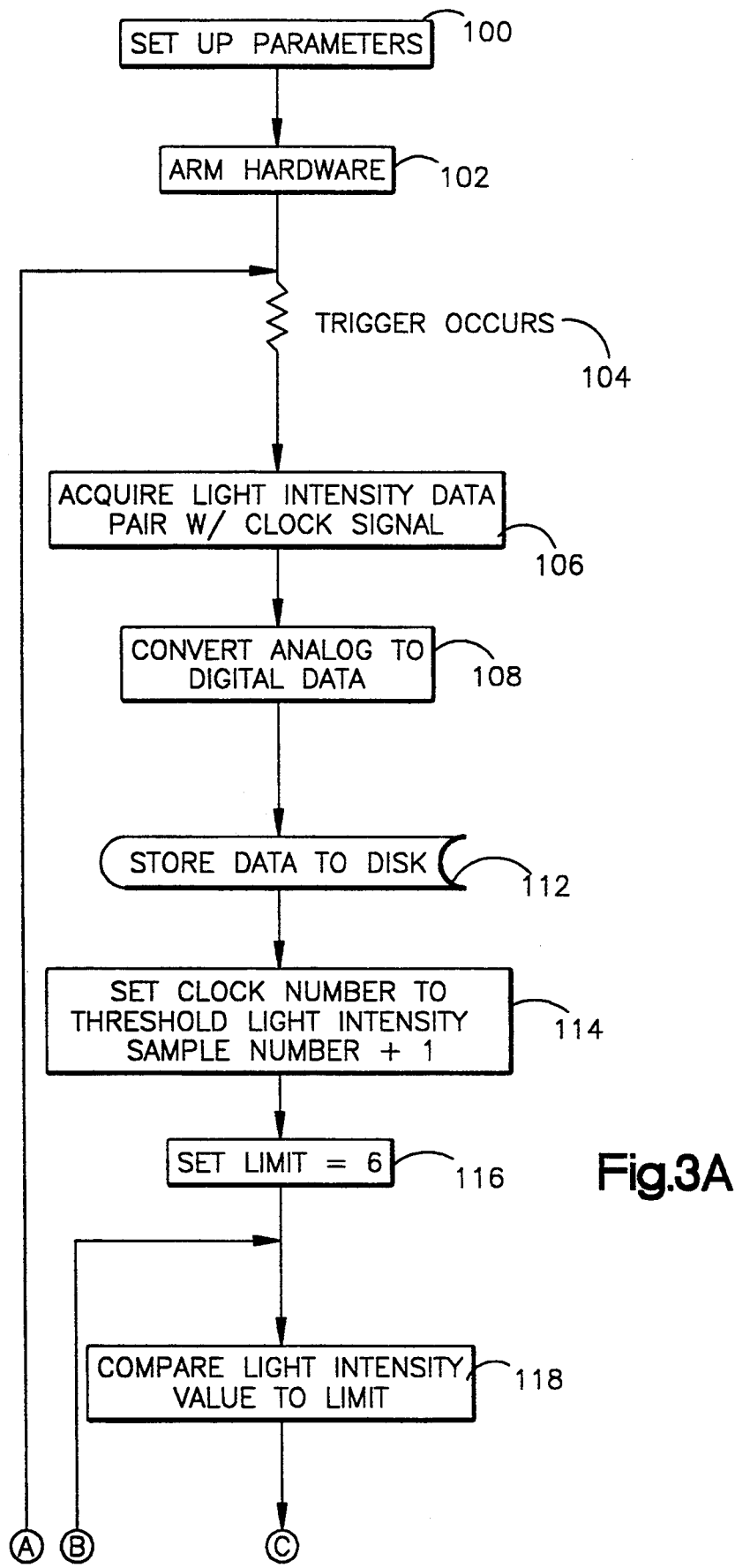
FIGS. 3A–3C, is a flow diagram illustrating the operation of the microcomputer employed in FIG. 1.
Figure 3B:
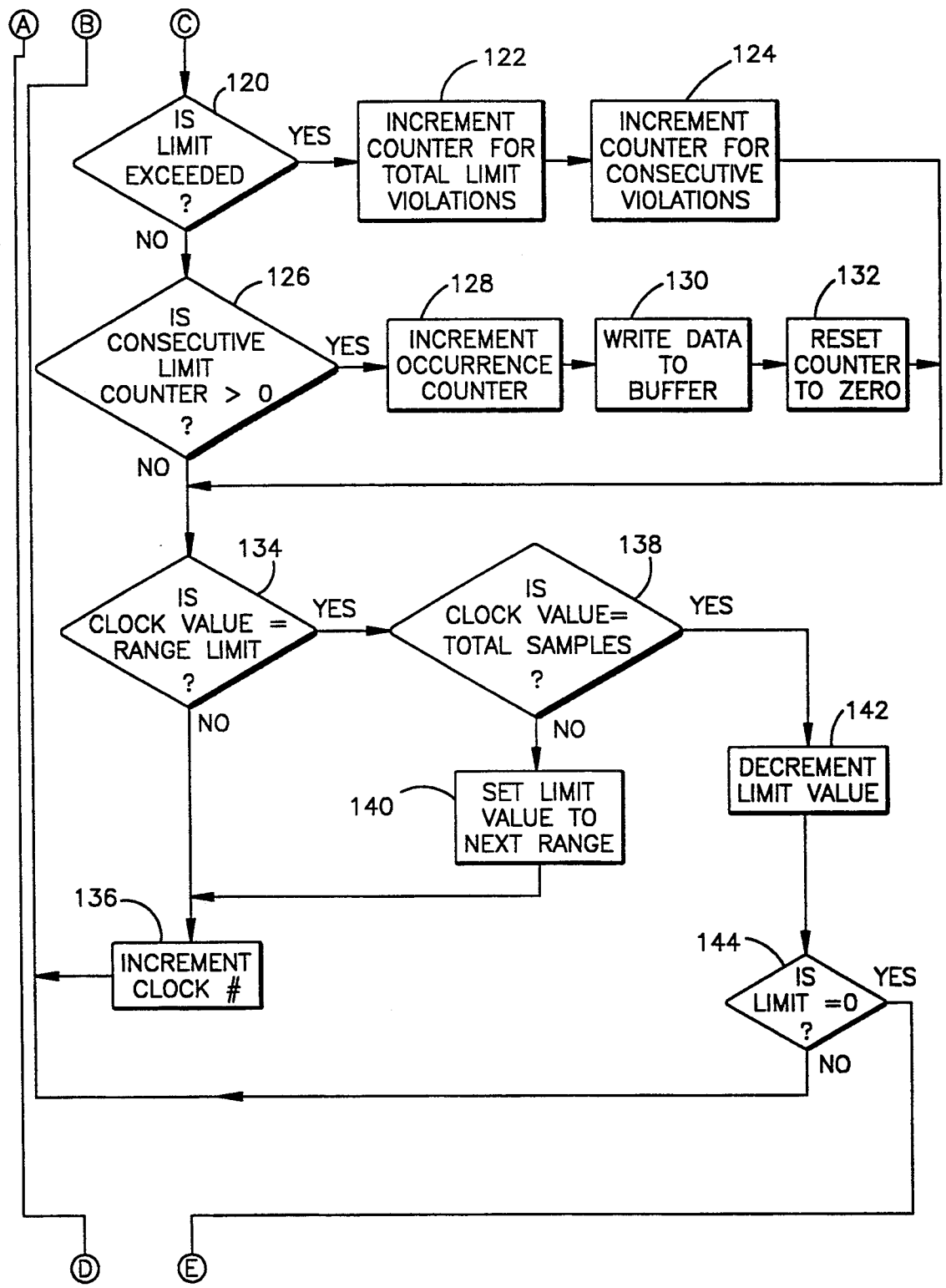
Figure 3C:
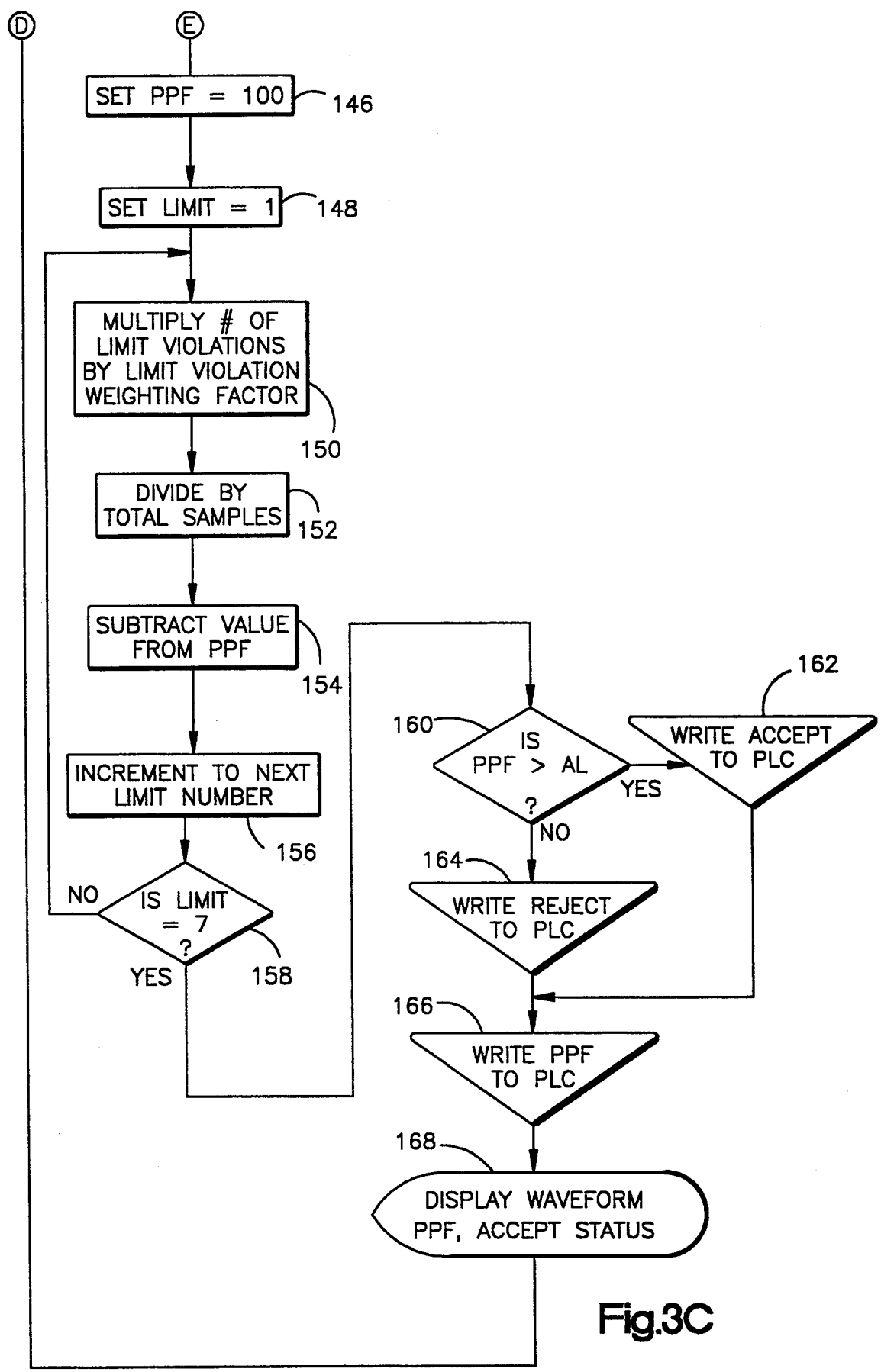

Reference is now made to FIG. 3 which illustrates a flow chart showing the manner in which the microcomputer 40 is programmed in accordance with present invention. At step 100, various parameters employed in the program are entered, as with a keyboard. These parameters include, for example, the values of the limits 1, 2, 3, 4, 5, and 6, and the value of the weighting factor for each limit. In the next step 102, the microcomputer 40 waits for a trigger signal from the PLC 60 to commence data acquisition. The trigger signal occurs at point 104 just prior to step 106. During step 106, the light intensity data is acquired and paired with a clock signal so as to obtain paired data. This data is converted by an analog-to-digital converter 42 at step 108 so as to provide a stream of digital data words representative of the respective light intensity samples. The data words are stored, such as with a hard disk storage 50, at step 112. The CPU 46 is now ready to start analyzing the data.

At step 114, a clock counter is set to the number of the sample at which the light intensity value exceeded the threshold light intensity limit 74 plus one. In the example being presented, the threshold limit 74 is exceeded at sample 110. Thus, the clock value is set to 111. At step 116 the limit is set to 6. Each sample in succession from sample 111 through sample 1,410 at the end of range B, will now be analyzed.

Each light intensity sample is compared to the light intensity value of limit 6 at step 118. A decision is made as to whether the sample has violated limit 6 at step 120. If limit 6 has been violated, then a total limit violation counter is incremented by one at step 122 and a consecutive violation counter is incremented by one at step 124. If this is the first sample to be analyzed, and if the light intensity sample violates the limit, then both the total counter and the consecutive violation counter are set to a count of 1.

If the limit is not violated, then a decision is made at step 126 as to whether the consecutive limit counter has a count greater than zero. If the consecutive violation count is greater than zero, then an occurrence counter is incremented by one, at step 128. This information is written into a buffer at step 130, and the consecutive violation counter is reset to zero at step 132.

To illustrate the process, assume that in a chain of eight successive light intensity samples, the first two samples violated the limit, the third sample did not violate the limit, samples 4 through 7 violated the limit, and sample 8 did not. In this case, after sample 2 has been analyzed, the data written into the buffer at step 130 will be 1,2. This means that there has been one occurrence of a consecutive violation and that the number of consecutive violations is 2. After that data has been written into the buffer due to the lack of violation of the limit at sample 3, the consecutive violation counter is reset to zero. The next consecutive violations take the form of samples 4, 5, 6, and 7. That is the second occurrence of a consecutive violation, and the number of consecutive violations is four (samples 4, 5, 6, and 7). Consequently, the data written into the buffer at step 130 will be 2,4. Assume that the next six temperature samples, 9 through 14, also represent violations of the limits. After sample 15 has been analyzed and found to not exceed the limit at step 120, the data written into the buffer at step 130 will be 3,6 (the third occurrence with six consecutive violations).

Continuing now with a discussion of the flow chart, if the count in the consecutive limit counter is not greater than zero, then the procedure skips to step 134. In step 134, a decision is made as to whether the clock value is equal to the range limit. During each analysis for violations of a limit, such as limit 6, there are two ranges, including ranges A and B (see FIG. 2). The value of a limit may differ from one range to another. This is particularly true with respect to the upper limits, as noted in FIG. 2. Assume limit 6 is 1,300 for range A. For range B, limit 6 may be increased by 6%. These limit values and percentages comprise part of the data entered into the computer during step 100.

In the example being presented, there are a total of 1,410 light intensity samples with 100 samples allocated to the trigger delay period 72, 10 more samples until the threshold light intensity value 74 is exceeded, 1,000 samples in range A and 300 samples in range B. At the end of range A, there should be a clock count of 1,110 samples. If the count is less than that, the clock counter is incremented at step 136 and the foregoing procedure from step 118 through step 134 is repeated until all of the samples through range A have been analyzed.

Once all of the samples in a range have been analyzed, a decision is made as to whether the clock value is equal to the total number of samples, at step 138. A "yes" decision will occur only upon the completion of analyzing all of the samples, at sample count 1,410. If only the samples through range A have been counted, the limit value is adjusted for the next range at step 140 and the clock is incremented by one. This will be the first sample in the next range, such as range B.

If all of the samples through range B have been analyzed, then the clock value in this example will be 1,410, which is equal to the total number of samples. In such a case, the limit value will be decremented by one at step 142 so that the limit is now set at 5. At step 144, a decision is made as to whether the limit value is equal to zero. If not, then the foregoing analysis will be repeated from sample 111 to sample 1,410 with respect to limit 5. This analysis is repeated until the limit value is determined to be zero in step 144. The procedure then proceeds to step 146.

At step 146, the plasma profile factor PPF is set to equal 100. At step 148, the limit number is set as limit number 1. This means that the routine will calculate that portion of the plasma profile factor PPF associated with the number of violations of limit 1. As discussed hereinbefore, the limits 1–6 are weighted. The weighting factor (WF) for limit 1 is 60,600. For limit 2, it is 1,518. For limit 3, it is 93. The weighting factor for limit 4 is 93. For limit 5, it is 1,518. For limit 6, it is 60,600. In the calculation set forth in step 150, the number of limit violations is multiplied by the weighting factor. Assume that the number of limit 1 violations is 1. The product of the number of limit 1 violations (1) and the associated limit 1 weighting factor (60,600) is 60,600. This number (60,600) is then divided by the total number of samples at step 152. In the example being given, the total number of samples is 1,410. Hence, the result is 42.98. This number is now subtracted from 100 leaving a result of 57.02 at step 154.

At step 156, the limit number is incremented to the next limit (2). At step 158, the limit number 2 is compared with limit 7 and since a match is not obtained, the above steps 150 through 154 are repeated for limit 2 violations. After steps 150 through 154 have been repeated, the limit is incremented to the next limit number (3). At step 158, the limit number 3 is compared with limit 7 and steps 150 to 154 are repeated. The above steps 150–156 are repeated for limit 4 through limit 6 violations.

After the limit 6 violations have been considered, the limit number is incremented to 7 at step 156 and this matches the limit set in step 158 and the procedure moves to a decision step 160.

At step 160, the calculated plasma profile factor PPF is compared to the acceptance limit (AL). If there had been no limit violations, the value of the plasma profile factor PPF would be equal to 100. If there had been violations, the value would be less than 100.

The acceptance limit AL may be set at some number such as 70. Thus, a plasma profile factor PPF in excess of 70 will be considered to represent an acceptable weld. If the plasma profile factor PPF is greater than the acceptance limit AL, then in accordance with step 162, the CPU 46 writes an "accept" to the PLC 60. If the plasma profile factor PPF is not greater than the acceptance limit AL, then in accordance with step 164, the CPU writes "reject" to the PLC 60. In either case, at step 166, the value of the plasma profile factor PPF is written by the CPU 46 to the PLC 60. This information may be forwarded to the main frame computer 68 after step 168 by the PLC 60 so that the information can be retrieved at a subsequent time. The light intensity waveform, such as wavefoden 70, along with the value of the plasma profile factor PPF and the accept or reject status is then displayed on the video display 52 in accordance with step 168. The monitoring system is now in condition for monitoring another weld process and determining the plasma profile factor PPF therefor.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for monitoring a weld process which delivers energy from a laser source to a workpiece along a process path while producing light emitting plasma at a beam delivery point along said path, comprising:

light detecting means for receiving light from said plasma and providing a light signal having a value which varies with changes in the intensity of the received light over a predetermined test interval;

means for providing a plurality of light intensity limits with each limit having a different value;

means for comparing said light signal with each of said limits and providing a violation indication each time said light signal violates one of said limits;

means for counting the number of said violation indications for each limit during said predetermined test interval;

means for evaluating the weld process as a function of the number of violation indications for said limits during said test interval; and means for providing an output indication of said evaluation.

2. An apparatus as set forth in claim 1 wherein said plurality of light limits includes a first upper light limit and a first lower light limit.

3. An apparatus as set forth in claim 2 wherein said predetermined test interval includes at least two ranges and wherein said first upper light limit has a different value for each of said ranges.

4. An apparatus as set forth in claim 2 including at least a second upper light limit which is higher than said first upper light limit and a second lower light limit which is lower than said first lower light limit.

5. An apparatus as set forth in claim 4 wherein weighted values are assigned to said light limits and wherein said second upper light limit has a weighted value greater than that of said first upper light limit and wherein said second lower light limit has a weighted value greater than said first lower light limit.

6. An apparatus as set forth in claim 1 wherein said light signal is an analog signal, and said apparatus further comprises means for sampling said analog signal and providing a predetermined number of light signal samples for application to said means for comparing, said means for comparing including means for receiving said light signal samples and comparing each said sample with each of said light intensity limits and providing a violation indication each time a light signal sample violates one of said limits.

7. An apparatus as set forth in claim 6 wherein said sampling means includes analog-to-digital means for converting said analog signal into said predetermined number of light signal samples.

8. An apparatus as set forth in claim 7 wherein a limit violation weighting factor is assigned to each of said limits and said apparatus further comprises means for multiplying the number of limit violation indications for each limit by the assigned weighting factor for that limit to obtain a product and for dividing that product by said total number of samples so as to provide a result for each limit and for subtracting the sum of the results for all of said limits from 100 to obtain a plasma profile factor.

9. An apparatus as set forth in claim 8 including means for comparing said plasma profile factor with an acceptable limit and for providing an output indication based on said comparison.

10. An apparatus as set forth in claim 9 including means responsive to said output indication for providing information respecting said output indication for application to a main computer for storage in and subsequent retrieval from said main computer.

11. An apparatus as set forth in claim 6 including consecutive counter means for counting the number of consecutive limit violation indications of a selected one of said limits, and means for comparing the number of said consecutive limit violation indications with a predetermined value to determine if said predetermined value has been violated.

12. A method for monitoring a laser process wherein energy from a laser source is delivered to a workpiece along a process path while producing light emitting plasma at a beam delivery point along said path, and comprising the steps of:

positioning a light detecting means so that said detecting means receives light from said plasma and provides a light signal having a value which varies with changes in the intensity of the received light over a predetermined test interval;

providing a plurality of limits with each limit having a different value;

providing a predetermined plurality of light samples of said light signal over a predetermined test interval;

comparing each said light sample with each of said limits and providing a violation indication each time a light sample violates one of said limits;

counting the number of violation indications for each limit during the predetermined test interval;

evaluating the laser process as a function of the number of violation indications; and providing an output indication of the evaluation.

13. A method as set forth in claim 12 wherein said step of providing a plurality of limits includes providing a first upper limit and wherein said predetermined test interval includes at least two ranges and wherein said first upper limit has a different value for each of said ranges.

14. A method as set forth in claim 12 wherein said step of providing a plurality of limits includes providing a first upper limit and a first lower limit and a second upper limit which is higher than said first upper limit and a second lower limit which is lower than said first low limit.

15. A method as set forth in claim 14 including the step of assigning weighted values to said limits and wherein said second upper limit has a weighted value assigned to it which is greater than that assigned to said first upper limit and wherein the weighted value assigned to said second lower limit is greater than that assigned to said first lower limit.

16. A method as set forth in claim 12 wherein a limit violation weighting factor is assigned to each of said limits and wherein the number of limit violations for each limit is multiplied by that limit's assigned weighting factor to obtain a product and wherein that product is divided by the total number of said predetermined plurality of samples so as to provide a result for each said limit and then subtracting the sum of said results for all of said limits from 100 to obtain a plasma profile factor.

17. A method as set forth in claim 16 wherein said plasma profile factor is compared with an acceptable limit for providing an output indication based on said comparison.

* * * * *